(12) United States Patent
Blomkvist

(10) Patent No.: US 6,335,967 B1
(45) Date of Patent: Jan. 1, 2002

(54) BUFFER FOR CONNECTION DATA

(75) Inventor: Peter Blomkvist, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/924,823

(22) Filed: Sep. 5, 1997

(30) Foreign Application Priority Data

Sep. 9, 1996 (SE) .............................................. 9603271

(51) Int. Cl.$^7$ ............................................. H04M 15/00
(52) U.S. Cl. .............. 379/112.01; 379/111; 379/114.01; 379/115.01; 379/121.04; 379/134
(58) Field of Search ................. 379/111–113, 114–115, 379/119–121, 120, 133–134, 164–165, 127, 112.01, 114.01, 115.01, 121.04, 121.05, 126, 127.01

(56) References Cited

U.S. PATENT DOCUMENTS

| | | | |
|---|---|---|---|
| 3,813,495 A | * 5/1974 | Conerly | |
| 4,528,589 A | * 7/1985 | Block et al. | |
| 5,218,632 A | * 6/1993 | Cool | 379/112 |
| 5,333,183 A | 7/1994 | Herbert | 379/112 |
| 5,499,240 A | 3/1996 | Gittins et al. | 370/68.1 |
| 5,506,893 A | * 4/1996 | Buscher et al. | 379/112 |
| 5,678,006 A | * 10/1997 | Valizadeh et al. | 709/223 |
| 5,682,523 A | * 10/1997 | Chen et al. | 711/3 |
| 5,734,705 A | * 3/1998 | Schlossman et al. | 379/117 |
| 5,784,442 A | * 7/1998 | Foti | 379/112 |
| 5,923,740 A | * 7/1999 | Ito et al. | 379/112 |
| 6,148,337 A | * 11/2000 | Estberg et al. | |

FOREIGN PATENT DOCUMENTS

| | | |
|---|---|---|
| EP | 0 621 706 A1 | 10/1994 |
| WO | WO 96/12375 | 4/1996 |

* cited by examiner

Primary Examiner—Duc Nguyen
(74) Attorney, Agent, or Firm—Burns, Doane, Swecker & Mathis, L.L.P.

(57) ABSTRACT

A device, a system and method for storing connection data transmitted by a telephone exchange (11) in an agent unit (19), where the agent unit is part of a subordinate means in a supervising system. A superordinate supervising means (24) is formed of one or more computers with the task of collecting data from one or more telephone exchanges, which they contact over some data network (23) via the agent unit (19). The connection data is transmitted by the exchange unit and stored in the reserved memory area (the buffer) (20) in the agent unit (19) and can be emptied and collected by the superordinate supervising means (24) through a normal file transfer process over said data network (23).

20 Claims, 2 Drawing Sheets

KNOWN TECHNIQUE

BUFFER FOR CONNECTION DATA

TECHNICAL FIELD

The present invention relates to a device, a system and a method in order, in a telephone exchange, in a simple way, via some service supervising means to enable access to, and also emptying of, a buffer where data concerning all of the calls put through by the telephone exchange are stored.

STATE OF THE ART

In modern telecommunication engineering there is always some form of supervision over the constituent objects of the tele communication system which ensures that the system functions correctly, corrects errors if such occur or quite simply warns the system operator if an error occurs which is not of such nature that the system itself can take care of it. The objects can be connected in some form of network and supervised by a superordinant supervising means, usually called "manager" or "system manager". A manager can be connected to one or more so-called agent units which supervise at least one object each. The agent units can send messages to the superordinated supervising means about their objects and are consequently physically placed between the superordinate supervising means and the object that they are intended to supervise. They can send messages on their own initiative or on request. An agent unit, often also called Proxy agent, is therefore a unit which possesses a certain intelligence and reports discovered errors to the superordinate supervising means. By the use of agent units the work load of the superordinate supervising means is made easier.

A common protocol which is used in supervising routines is Simple Network Management Protocol, SNMP. An agent is therefore often called an SNMP agent and in the same way the superordinate supervising means is called an SNMP manager. A system with agents is described for example in EP-A2 0 621 706.

Other prior art with systems of agent units and functions of these agent units are to be found in the two Swedish patent applications SE 9504393-1 and SE 9504394-9. Today's telephone exchanges usually send out certain call data via an interface for treatment without having to store the same. For each conversation which is put through the telephone exchange information is sent out about the conversation, so-called connection data. The connection data comprises amongst others "charging data" i.e. the information which is needed for the correct charging of the customer, but also for example which path a call has taken. The charging data however, only comprises the information which is necessary for correct call charging, i.e. which number was calling, who was called, i.e. the A subscriber and the B subscriber, and for how long the call was in progress. According to the prior art one usually connects an external buffer via the telephone exchange in order to store the charging data. This will be called a "Call Account Buffer—CAB" from now on. When collecting the information from the buffer then it must be rung up from a supervising organ via a modem or via a direct connection and emptied. Received data is then processed in a unit which in this field of use can be called an "Call Account Manager—CAM", in order to be able to form the basis for a correct call charging. This CAM can be the same computer as the supervising means or equally well a free-standing computer with a connection to the supervising computer.

The limitations with this technique lie foremost in that a modem must be used in order to access the buffers, which is very time consuming and nearly untenable in large systems where a computer could function as the supervising unit for, for example, hundreds of company exchanges. Furthermore, it is only possible to ring up one CAB at a time for emptying. Such a system also has difficulties in alarming the supervising unit, with, for example, alarms when a buffer needs emptying.

DISCLOSURE OF THE INVENTION

The invention is intended to solve on the one hand the problem with slow emptying of the buffers and on the other hand the difficulties with the buffer alarms through in a new way using an agent/agents which are placed to supervise a telephone exchange. The object with the invention is further, in a reliable and extremely fast way, to empty buffers which contain the information which is necessary for correct call charging. The invention permits several buffers to be emptied at the same time. Yet another object is to simplify and improve administration through giving a possibility for buffers to alarm the superordinate supervising means if a certain degree of filling has been passed or some other problem is present.

According to the prior art a telephone exchange sends out via one of its ports data about each call, the A subscriber, the B subscriber, the length of call and so on. The data is collected in an external buffer "Call Account Buffer—CAB". Emptying often occurs on regular basis (for example once a week) by a supervising unit which can be a normal PC. The PC must then via modem or via a direct connection and through the normal fixed public net, PSTN, ring up the buffer and empty it. Transmissions via modem are unfortunately a slow and furthermore relatively insecure method. In a case where a tele communications operator using a single supervising means shall collect together the "charge data" from for example an extremely large number of company exchanges—PBXs where a considerable quantity of telephone calls in each exchange has been made during a week it can be understood that the total quantity of data in the buffers can be enormous. The buffers of the different company exchanges naturally are filled at different speeds and with today's technology there are poor possibilities for these so-called CABs to alarm the supervising means when emptying of these needs to be performed. This complicates administration and data can be lost because the CAB is able to become overfilled before the supervising means manages to empty it.

The invention solves the above problems through a device where a buffer instead is integrated completely physically in the agent unit which is placed to supervise the telephone exchange in question. The agent unit, which physically can be situated in the vicinity of, or alternatively integrated in, the telephone exchange, communicates with the same through some supervising specific protocol, for example SNMP, normally is in connection with the superordinate supervising means, SNMP manager, via an access port and through some sort of data network, for example the Internet or some form of Intranet. Through dedicating a memory area in said agent and in this way realising a buffer the connection data or only the charging data can be transmitted from an exchange unit to the buffer in order to be stored and then the stored data can be emptied and transmitted to the SNMP manager with the help of a normal file transferring protocol, for example FTP.

The problems can be further said to be solved through a system which with a superordinate supervising means, an agent unit and connection therebetween via some data network, reserves memory space in said agent unit for storage of connection data or only charging data sent from an exchange unit, where the agent unit is in communication with the access port in the exchange unit which transmits said data.

The problems are also solved through a method for storing of either the connection data or at least the charging data that an exchange unit generates in a memory space reserved for this purpose in an agent unit connected to the exchange unit whereupon a superordinate supervising means which via a data network is connected to the agent unit initiates emptying of the buffer incorporated in the agent unit at some indication from said agent unit.

By means of these solutions to said problems a number of advantages are obtained. Since the transmission speed via data networks through normal file transmission is much higher than that which transmission according to earlier known techniques can offer, that is via modem and via the usual fixed telephone network, it is made possible that a computer which acts as a superordinate supervising means can supervise an extremely large number of exchange units with associated agent and buffers for the collection of data necessary for correct charging. These can also be accessed simultaneously and, via the data network, a number of them can be emptied at the same time. Through the agent units also possessing a certain intelligence the process of alarm communication between the buffer and the supervising means is also simplified. Alarms can for example concern errors in the buffer, overfilled buffer, certain other buffer levels fulfilled, or alarms about pure programware errors. The buffer is then emptied through normal file transferring through the data network to which both the agent unit and the superordinate supervising means are connected.

Said solution also means that a number of modems become superfluous. Other implementations are also conceivable in the agent, such as for example compression of the data, which would give even faster transferring of the requested data.

DESCRIPTION OF THE FIGURES

The advantages of the invention will become more evident from the following description of a preferred embodiment of the invention together with the accompanying drawings, where.

PREFERRED EMBODIMENT

Figure 1:
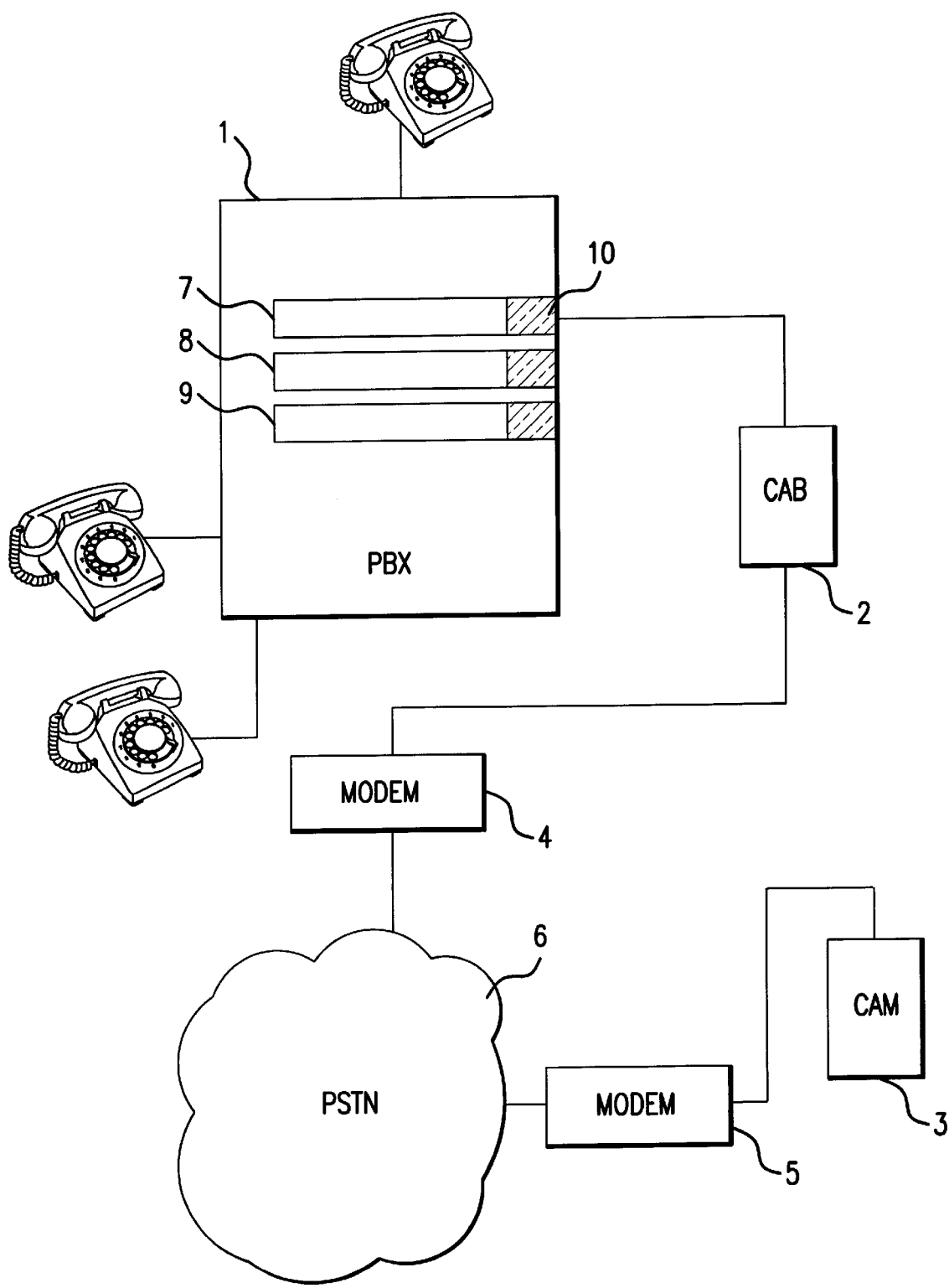
FIG. 1 shows according to prior art a part of a supervising system for an exchange unit which manages charging data.

FIG. 1 shows with a block diagram how with the prior art it is possible to empty a buffer 2 connected to an exchange unit 1. The exchange unit has a PBX with a limited number of connected telephones but even large public exchanges can have similar arrangements. As an external unit outside the exchange unit 1 there is a buffer 2 which has the task of collecting charging data on each call which passes through the exchange. A supervising means 3 which is arranged to supervise the exchange unit 1, or which only has the task of emptying the buffer 2 of charging data, can, via modem 4 and 5 and via the normal fixed public telephone network, PSTN, 6, reach the buffer. The exchange unit 1 comprises a number of cards 7–9 with which the external units can communicate and exchange information. Each card has therefore an interface 10 to the external environment.

Figure 2:
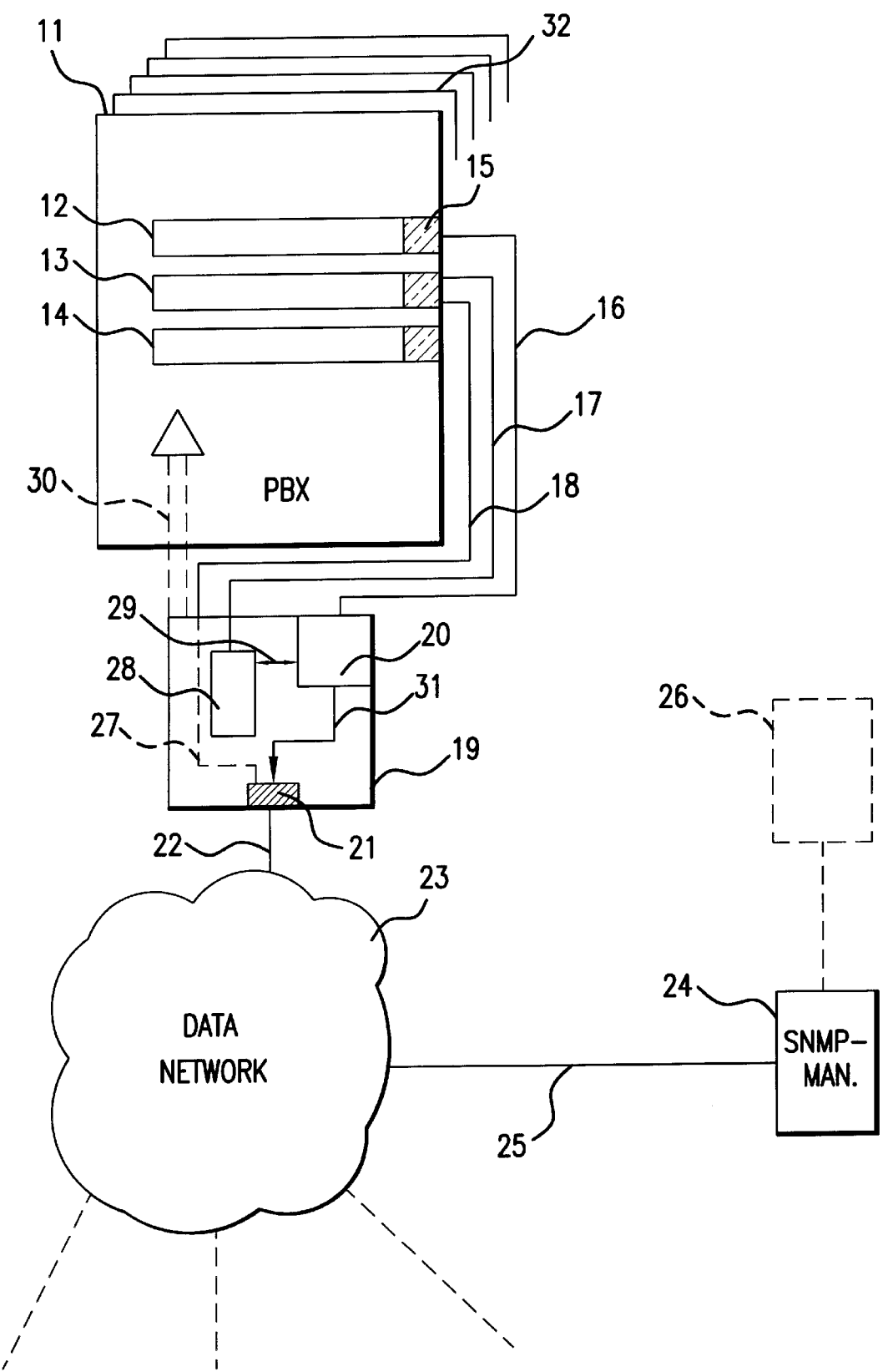
FIG. 2 shows according to the invention a part of a supervising system for an exchange unit which manages charging data.

FIG. 2 shows a principle diagram in the form of a block diagram describing how an arrangement according to the invention preferably is intended to appear. The exchange unit 11, which in the preferred embodiment can be considered to be a PBX, but also could be a large public exchange, comprises a number of cards for external communication. These are illustrated in FIG. 2 with the reference number 12–14. Normally an exchange unit contains a large number of such cards but for the sake of simplicity only three are shown here. Different types of operating and connecting data can be taken from these, normally through V.24 ports which are the connecting points of said cards to the surrounding environment. Through one of these ports, for example the upper, 15, in FIG. 2, so-called "Call Account Data" or charging data is transmitted. This data shall then be buffered and later emptied in order to be able to be processed so that the right customer can pay the right sum for his calls. The data can naturally also be used for other purposes, such as, for example, for statistics or for traffic calculations.

The agent unit 19 is used as a supervising means which via a supervising specific protocol, here SNMP, supervises and communicates with the exchange unit 11. It possesses a certain intelligence so that there is the possibility to detect errors in order to, by its own initiative or on request, communicate with the superordinate supervising means 24, in this embodiment an SNMP manager. Other supervising specific protocols than SNMP are naturally also applicable to the invention. The SNMP manager 24 can also make different types of requests to the agent 19 which answers with the requested information.

The superordinate supervising means which here is realized by an SNMP manager 24, can be a single computer which collects charging data and processes it. It can also be one of a number of interconnected computers which divide up the supervising routines. Each computer can also be conceived to be in connection with a freestanding Call Account Manager CAM 26 which is used in order to process the data collected by the SNMP manager 24.

The agent unit 19 is most often physically situated in the vicinity of the exchange unit 11, and the card connections are realized via said V.24 ports, as shown in FIG. 2 with the reference number 15. Charging information is sent through this port on the card 12 via a connection 16, as mentioned earlier, and stored in a part in the agent unit's memory 20 which is reserved for just this purpose. In order to realize this it is necessary that certain software is written in order to receive strings with charging information and store these in a file system in the dedicated memory area 20 in the agent unit 19. This should be a simple task for a person skilled in the art. The memory are shall preferably be of a "non-volatile" memory type as security against voltage reductions.

In another embodiment it is also conceivable that the agent unit 19 is integrated into the exchange unit 11. This is illustrated in FIG. 2 by the arrow 30.

The normal SNMP traffic can then go through another connection 17 to another card 13. By means of another connection 18 it is conceivable that MML commands, (Man Machine Language) can be sent from the SNMP manager 24 to the exchange unit 11. The agent unit 19 can in this way according to prior art be made to appear transparent which is illustrated in FIG. 2 by means of the connection 18 being shown dashed 27 through the agent unit 19.

This embodiment also permits that through a simple modification of the software the agent unit 19 can be made to transmit an alarm via SNMP to the superordinate supervising means 24. The alarm can for example be activated at a certain degree of fullness of the buffer 20. The intelligence of the agent unit is illustrated in the Figure by a processor 28 which can supervise 29 the degree of fullness in the buffer 20. Through a network access port 21 and via some data network 23 the agent unit is in communication with the SNMP manager 24. In this case the SNMP manager 24 by means of a command to the agent unit can easily empty the buffer over the data network 23 via a common file transfer protocol, for example FTP. The agent unit is therefore in connection 22, 25 with the superordinate supervising means 24 via a data network 23, preferably the normal TCP/IP based network such as the Internet or local Intranet so that the connections 23 and 25 are for example normal Ethernet connections, and in this way can be reached with a normal net address. The emptying of the buffer 20 can consequently take place through the processor 28 in the agent unit 19 detecting that a certain predetermined level of fullness has been reached and then initiating an emptying to the SNMP manager 24 through the connection 31 of the buffer to the network access port 21 and further through the data network 23 and via the connections 22 and 25. The SNMP manager can also initiate emptying of the buffer on its own authority, for example through instructing the agent unit 19 that emptying of the buffer 20 shall take place at some time regular interval, for example once per day, or the like. The software which is necessary for a regularly timed emptying of the buffer can also be implanted in the agent unit which in this case initiates the regular emptying instead of the SNMP manager.

FIG. 2 shows for the sake of simplicity an embodiment where an SNMP manager supervises an agent which in turn supervises an exchange unit. However, it must be understood that this invention will best show its advantages in large systems with a number of exchange units 32 where each exchange unit is supervised by at least one agent unit and where all the agent units can be supervised by a single or a low number of superordinate supervising means which with the help of the invention can process an extremely large quantity of data.

In order to further increase the capacity during transferring of charging information from the agent unit 19 to the superordinate supervising means 24 the data through some standard method can be compressed in the agent unit before it is sent via some file transfer protocol over the data network 23.

What is claimed is:

1. Agent unit for supervising at least one exchange unit, where the agent unit is arranged to relieve at least one superordinate supervisor unit, the agent unit comprising:
    at least one connection connecting said agent unit to said exchange unit for communicating with the exchange unit via some supervising specific protocol;
    at least one data network connection connecting said agent unit to said superordinate supervisor unit for communicating with the superordinate supervisor unit;
    a further connection connecting said agent unit with the exchange unit for receiving connection data, relating to the connections set up by the exchange unit which are transmitted by the exchange unit; and
    a buffer for storing the received connection data.

2. Agent unit according to claim 1, characterised in that the received connection data comprises charging data.

3. Agent unit according to claim 1, wherein the agent unit is arranged to be able to supervise a degree of fullness of the buffer and at a predetermined opportunity inform the superordinate supervisor unit that emptying of the buffer shall take place, whereupon emptying is arranged to take place via said data network connection.

4. Agent unit according to claim 1, wherein compression of the connection data is arranged to take place in the agent unit before the buffer is emptied.

5. The agent unit of claim 1, wherein the buffer is inside the agent unit.

6. The agent unit of claim 1, wherein the at least one data network connection is an Ethernet connection.

7. The agent unit of claim 1, wherein the supervising specific protocol is SNMP (Simple Network Management Protocol).

8. Method for storing and emptying connection data generated from at least one exchange unit, wherein at least one superordinate supervisor unit supervises operation of the at least one exchange unit, and the superordinate supervisor unit is relieved by at least one agent unit comprising a buffer, at least one connection to the superordinate supervisor unit via a data network, and at least one connection to the at least one exchange unit, the method comprising the steps of:
    collecting connection information relating to the connections set up by the exchange unit from each at least one exchange unit;
    storing the collected connection information in the buffer of a corresponding one of the at least one agent unit; and
    emptying the buffer to the superordinate supervisor unit through the data network upon an indication from the at least one agent unit.

9. System for supervising at least one exchange unit, comprising:
    at least one superordinate supervisor unit;
    at least one agent unit comprising a buffer for receiving and storing connection data for connection put through by the at least one exchange unit;
    a connection between the at least one exchange unit and the agent unit;
    a connection between each at least one agent unit and the superordinate supervisor unit via a data network;
    a further connection connecting said agent unit with the exchange unit for receiving connection data, relating to the connections set up by the exchange unit which are transmitted by the exchange unit
    wherein the at least one agent unit receives operating information from the at least one exchange unit and transmits the operating information to the superordinate supervisor unit, and the superordinate supervisor unit is arranged to empty the buffer of the at least one agent unit of stored connection information via a protocol specific for file transfer.

10. System according to claim 9, wherein the received connection data comprises charging data.

11. System according to claim 9, wherein the connection data is arranged to be compressed into the agent unit before emptying of the buffer takes place.

12. System according to claim 9, wherein the agent unit is integrated in the exchange unit.

13. The system of claim 9, wherein the protocol is FTP (File Transfer Protocol).

14. Method for storing and emptying connection data generated from at least one exchange unit, wherein at least one superordinate supervisor unit supervises operation of the at least one exchange unit, and the superordinate supervisor unit is relieved by at least one agent unit comprising a buffer, at least one connection to the superordinate supervisor unit via a data network, and at least one connection to the at least one exchange unit, the method comprising the steps of:

collecting connection information relating to the connections set up by the exchange unit from each at least one exchange unit;

storing the collected connection information in the buffer of a corresponding one of the at least one agent unit; and emptying the buffer to the superordinate supervisor unit through the data network upon an indication from the at least one agent unit to the superordinate supervisor unit when the buffer reaches a certain predetermined degree of fullness.

15. Method according to claim 14, wherein the connection information includes charging data.

16. Method according to claim 14, further comprising the step of compressing the connection information before the buffer is emptied.

17. The method of claim 14, wherein the step of emptying is performed using the FTP (File Transfer Protocol).

18. The method of claim 14, wherein the step of emptying is performed at regular time intervals.

19. The method of claim 14, further comprising the step of simultaneously emptying the buffers of multiple agent units.

20. A system for supervising at least one exchange unit, comprising:

at least one telephone connected to the exchange unit;

a buffer;

at least one superordinate supervisor unit;

at least one agent unit comprising a buffer for receiving and storing connection data for a call put through by the at least one exchange unit;

a first connection between the at least one exchange unit and the agent unit;

a second connection between each at least one agent unit and the superordinate supervisor unit via a data network;

a third connection connecting said agent unit with the exchange unit for receiving connection data, relating to the connections set up by the exchange unit, and operation data each transmitted by the exchange unit wherein the received data is buffered and processed, and;

wherein the at least one agent unit receives operating information from the at least one exchange unit and transmits the operating information to the superordinate supervisor unit, and the superordinate supervisor unit is arranged to empty the buffer of the at least one agent unit of stored connection information via a protocol specific for file transfer.

* * * * *